(12) United States Patent
Heim et al.

(10) Patent No.: US 7,923,097 B2
(45) Date of Patent: Apr. 12, 2011

(54) SECURITY ELEMENT WITH THIN-LAYER ELEMENT

(75) Inventors: Manfred Heim, München (DE); Ralf Liebler, Gmund (DE); Markus Krombholz, Holzkirchen (DE)

(73) Assignee: Giesecke & Devrient GmbH, Munich (DE)

( * ) Notice: Subject to any disclaimer, the term of this patent is extended or adjusted under 35 U.S.C. 154(b) by 1154 days.

(21) Appl. No.: 10/568,063

(22) PCT Filed: Aug. 9, 2004

(86) PCT No.: PCT/EP2004/008912
§ 371 (c)(1),
(2), (4) Date: Jul. 17, 2006

(87) PCT Pub. No.: WO2005/015271
PCT Pub. Date: Feb. 17, 2005

(65) Prior Publication Data
US 2007/0190297 A1    Aug. 16, 2007

(30) Foreign Application Priority Data
Aug. 12, 2003 (DE) .................. 103 37 331

(51) Int. Cl.
*B32B 5/16* (2006.01)
*B32B 7/00* (2006.01)
*B41M 3/14* (2006.01)
*B44F 1/12* (2006.01)
*C09D 11/02* (2006.01)
*B05D 3/02* (2006.01)

(52) U.S. Cl. ............ 428/204; 428/206; 428/916; 427/7; 427/256; 427/288; 427/375; 427/411; 106/31.13; 283/72; 283/94

(58) Field of Classification Search ............... 427/7, 256, 427/265, 375, 288, 411; 283/72, 94; 428/457, 428/458, 916, 204, 206; 106/31.13, 400
See application file for complete search history.

(56) References Cited

U.S. PATENT DOCUMENTS

| 6,243,204 | B1 | 6/2001 | Bradley, Jr. et al. |
| 6,383,638 | B1 | 5/2002 | Coulter et al. |
| 6,761,959 | B1 * | 7/2004 | Bonkowski et al. .......... 428/156 |
| 7,085,058 | B2 * | 8/2006 | Heim .......................... 359/582 |
| 2004/0105963 | A1 | 6/2004 | Bonkowski et al. |

(Continued)

FOREIGN PATENT DOCUMENTS

DE   43 43 387 A1   6/1995

(Continued)

OTHER PUBLICATIONS

Definition of "Monodisperse Polymere", from Encycl. Polym. Sic, Engng., vol. 10, 19ff, Thiem Verlag, 1995.

(Continued)

*Primary Examiner* — Kirsten C Jolley
(74) *Attorney, Agent, or Firm* — Bacon & Thomas, PLLC

(57) ABSTRACT

The invention relates to a security element for security papers, documents of value and the like having a thin-layer element (12) with color shift effect, which has a reflection layer (14), an absorber layer (18) and a spacer layer (16) disposed between reflection layer (14) and absorber layer (18). According to the invention the spacer layer (16) is formed by a printed layer having dispersion particles (20) with monomodal or oligomodal size distribution.

57 Claims, 3 Drawing Sheets

U.S. PATENT DOCUMENTS

Figure 6:
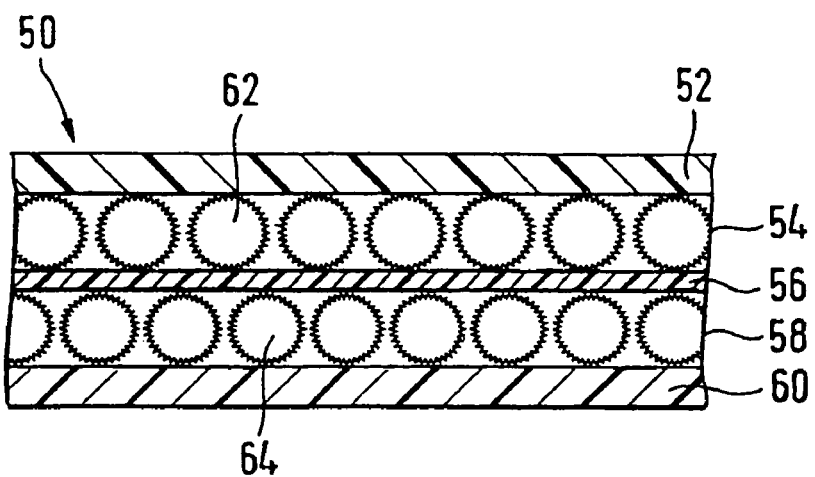

2004/0177789 A1* 9/2004 Heider et al. .................. 106/499
2005/0001038 A1* 1/2005 Walter et al. .................. 235/487

FOREIGN PATENT DOCUMENTS

| DE | 10202035 A1 * | 7/2003 |
|---|---|---|
| EP | 0 395 410 A2 | 10/1990 |
| WO | WO 00/34395 | 6/2000 |
| WO | WO 01/03945 A1 | 1/2001 |
| WO | 02/18155 A2 | 3/2002 |
| WO | 03/016073 A1 | 2/2003 |
| WO | 2004/014663 A1 | 2/2004 |

OTHER PUBLICATIONS

Mitteilung Wolff-Cellulosics Nitrocellulose, Aug. 14, 2003, one page.

* cited by examiner

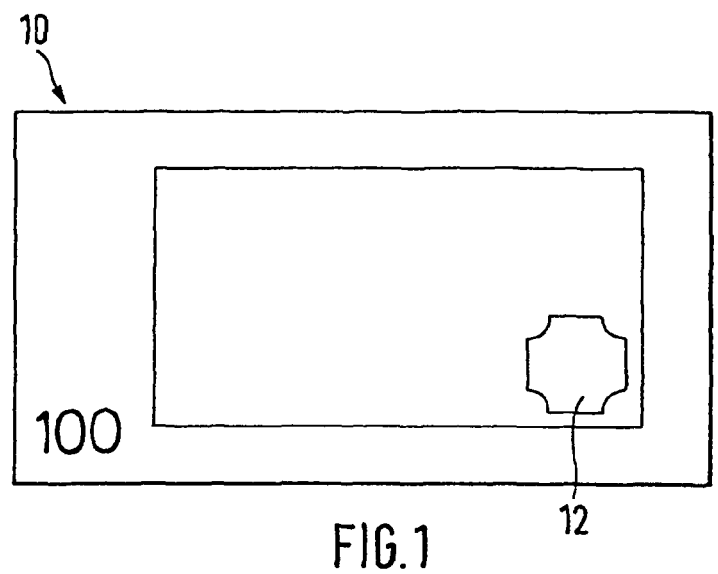
FIG.1
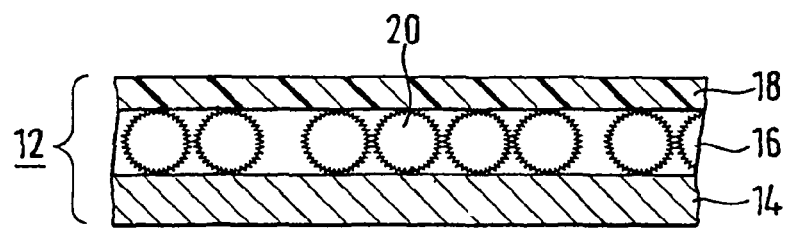
FIG.2
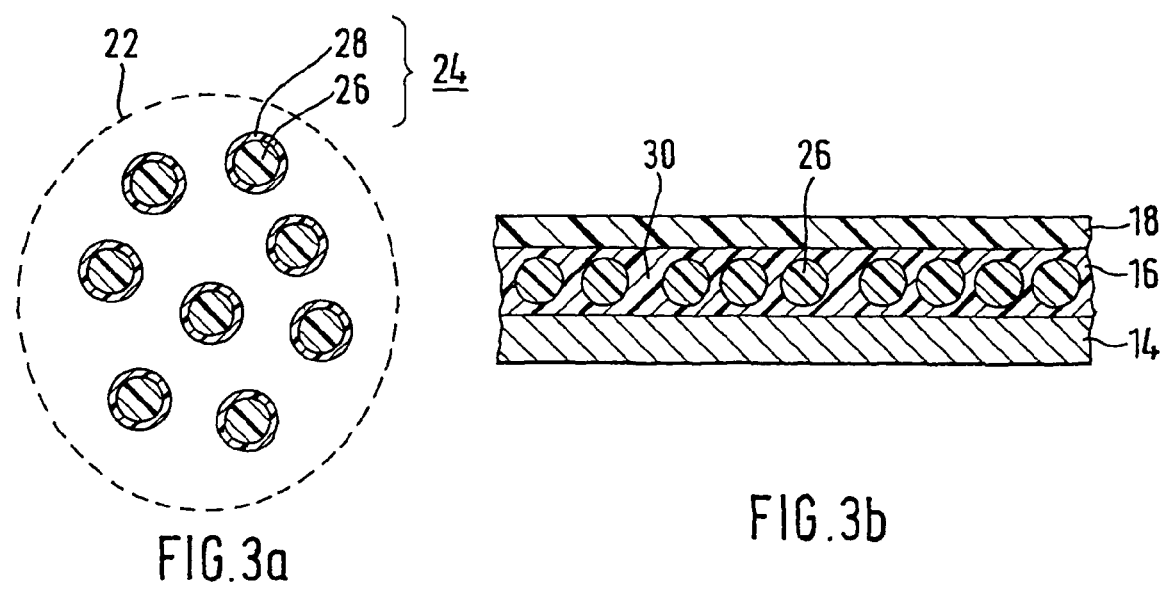
FIG.3a
FIG.3b

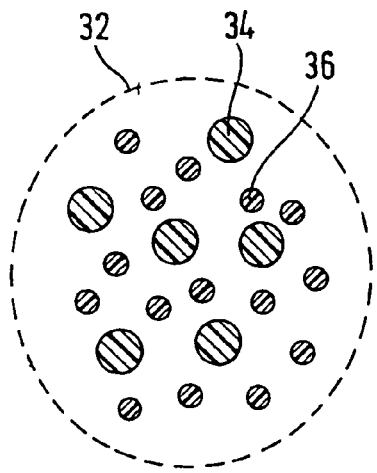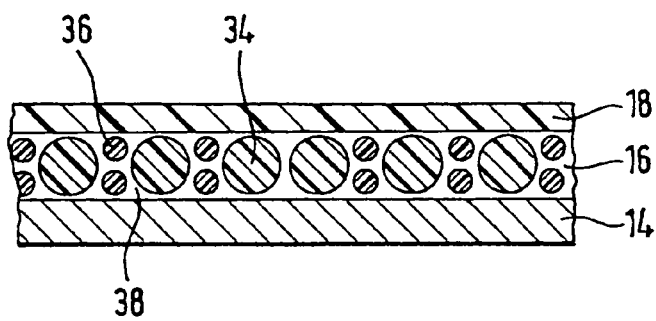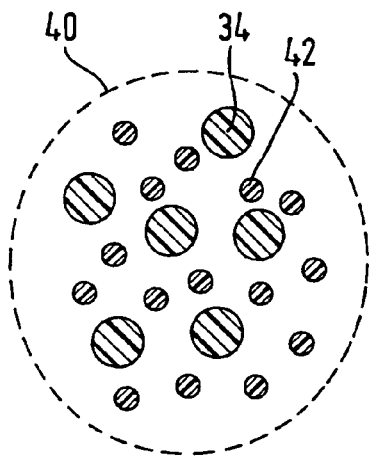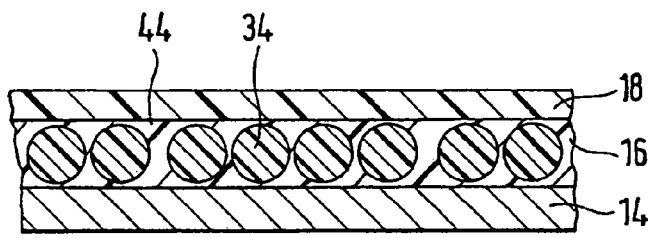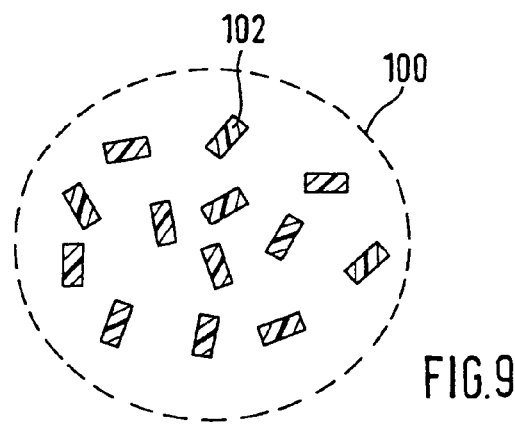

SECURITY ELEMENT WITH THIN-LAYER ELEMENT

The invention relates to a security element for security papers, documents of value and the like having a thin-layer element with color shift effect, which has a reflection layer, an absorber layer and a spacer layer disposed between reflection layer and absorber layer. The invention also relates to a security paper, a document of value, a method for producing such a security element and a printing ink having optically variable coloring pigments, and a production method for producing such a printing ink.

Documents of value, such as for example bank notes, share certificates, bond certificates, deeds, vouchers, checks, high-quality admission tickets, but also other papers in danger of being forged, such as passports or other identification documents, normally are provided with various security features for increasing the forgery-proofness. The security feature for example can have the form of a security thread embedded in a bank note, an applied security strip, or a self-supporting transfer element, such as a patch or a label that after its manufacturing is applied onto a document of value.

It is known to use security features having multilayer thin-layer elements, the color effect of which changes with the viewing angle of the viewer for example from green to blue, from blue to magenta, or from magenta to green. The color effect is based on interference effects that result from multiple reflections in the various partial layers of the thin-layer element and is described in detail, for example, in the print EP 0 395 410 B1. Such color changes when tilting a security feature are referred to as color shift effect in the following.

An ultrathin dielectric layer (mostly of a thickness of about 100 to 500 nanometers) contained in the thin-layer elements is the layer that is mainly responsible for the color effect, typically it is disposed between an absorber layer and a reflection layer. The thin dielectric layers are produced with the help of a complex vacuum vapor deposition method. In particular with large-surface coatings required for security papers and bank notes the requirements as to precision are extremely high, so that such coatings can be produced in only few places in the world.

On these premises the invention is based on the problem to specify a generic security element that compared to prior art can be produced simpler and more cost efficient.

This problem is solved by the security element having the features of the embodiments described herein. A security paper for producing security documents, a document of value having such a security element, and a production method for such a security element are subject matter of the independent claims. A further aspect of the invention is a printing ink having optically variable coloring pigments and a production method for such a printing ink.

The security element according to the invention is based on the prior art in that the spacer layer is formed by a printed layer having a monomodal or oligomodal dispersion particle size distribution. Since in the printed layer only dispersion particles with one specific size (monomodal distribution) or with few different sizes (oligomodal distribution) are present, a very high layer thickness constancy of the spacer layer can be obtained, as explained in more detail in the following.

According to a preferred embodiment of the invention the printed layer contains a main species of mainly spherical, monodisperse dispersion particles, the diameter of which determines the thickness of the spacer layer. Within the framework of the present invention particles are referred to as monodisperse, when the particle distribution is very narrow, preferably when for the particle size distribution the following applies: $\sigma_m/d_m < 20\%$, especially preferred $<5\%$, $d_m$ representing the average value and $\sigma_m$ the standard deviation of the size distribution. Clearly speaking, all monodisperse dispersion particles of the printing ink substantially have the same diameter $d_m$. Monodisperse particles have a monomodal size distribution, since the average diameter $d_m$ represents the only mode of size distribution.

The dispersion particles of the main species preferably have a diameter $d_m$ between about 100 nanometers and about 1500 nanometers, preferably between about 200 nanometers and about 1000 nanometers, especially preferred between about 200 nanometers and 500 nanometers. As to obtain a desired color effect, while considering the refractive index n of the material, dispersion particles with a diameter $d_m$ are chosen, so that the required optical thickness $n*d_m$ of the spacer layer is obtained. When the dispersion particles have a diameter within the range as stated above, virtually every desired color shift effect can be realized with the help of the printed spacer layer.

Expediently, the printed layer comprises a monolayer or submonolayer of the dispersion particles of the main species. Because of the uniform size of the dispersion particles the monolayer or submonolayer also has a very uniform thickness. By this measure a uniform layer thickness of the printed layer can be guaranteed even for a larger surface area, in particular for the width of a roll.

According to an advantageous embodiment of the invention the dispersion particles are formed such that they melt during a process following the printing operation. Therefore, the dispersion particles of the main species preferably have a melting temperature in the range of 50° C. to 250° C., especially preferred in the range of 80° C. to 120° C.

Through this melting a possibly uneven surface of the printed layer can be levelled out. At the same time the adhesion of the individual dispersion particles to each other and the adhesion of the particles to the layer therebelow is improved. The color purity of the thin-layer element can be substantially improved by the printed layer being levelled out.

The dispersion particles of the main species can be formed, for example, by polystyrene, styrene-acrylonitrile copolymers (SAN), aromatic polyesters or polyamides.

According to a different advantageous embodiment of the invention the dispersion particles of the main species have a core-shell structure with a not meltable or high-melting core and an easily film-forming shell. Having such a structure the core of the dispersion particles remains stable during a temperature step, while the shells of the dispersion particles melt and form an ideally continuous film. With the help of this film a very good levelling of the printed layer is obtained. Moreover, the adhesion of the printed layer to the layer therebelow and the adhesion of the dispersion particles to each other is strongly increased.

In advantageous embodiments the core of the dispersion particles is formed of a hard polymer such as polystyrene, PMMA, styrene-acrylonitrile copolymers (SAN), aromatic polyesters or polyamides and the shell is formed of PMMA, polybutadiene or polyisoprene.

According to a further preferred embodiment the printed layer, beside the dispersion particles of the main species, also comprises dispersion particles of a smaller size, which are disposed in spaces between the mainly spherical dispersion particles of the main species. In this case the size distribution of the dispersion particles is oligomodal, since beside the main species having a diameter $d_m$ at least one further species having a diameter $d_{zw} < d_m$ is present. If the size of the further species is substantially smaller than the diameter of the main species, the dispersion particles of the additional species lead to a smoothing and levelling of the printed layer. The diameter of the smaller species preferably is smaller than $0.5*d_m$, especially preferred smaller than $0.25*d_m$. It is understood, that the size distribution of the smaller dispersion particles does not have to be as narrow as that of the main species, since they do not determine the thickness of the spacer layer.

In an expedient embodiment the dispersion particles of smaller size have a melting temperature such low that they melt and form a film when the printed layer is dried. Thereby, as described above, beside the printed layer being levelled an improved adhesion of the dispersion particles to each other and to the layer therebelow is obtained.

Optionally, additional levelling and/or film-forming additives, such as for example PVA or polysorbate 20 may be used in order to optimize the film-forming and the levelling of the surface.

In advantageous embodiments the reflection layer is formed by an opaque reflector layer, in particular made of a metal, such as aluminum, silver, nickel, copper, iron, chromium or gold.

The security element likewise can have the form of a semitransparent color-shift security element. In this case instead of an opaque reflection layer an absorber layer, a semitransparent metal layer or a transparent reflection layer, the refractive index of which differs from that of the printed layer, is used as a reflection layer. Basically, nearly all transparent compounds which can be vapor-deposited are suitable as a transparent reflection layer, in particular also higher refracting coating materials such as $ZrO_2$, $ZnS$, $TiO_2$ and indium tin oxides (ITO). The layer thickness of the transparent reflection layer preferably lies in the range of 30 nanometers to 300 nanometers, especially preferred 50 nanometers to 60 nanometers.

Metal layers made of materials such as chromium, iron, gold, copper, aluminum or titanium of a thickness of preferably 4 nanometers to 20 nanometers typically serve as absorber layers. Compounds such as nickel-chromium-iron or rarer metals such as vanadium, palladium or molybdenum can also be used as absorber layer materials. Further suitable materials are e.g. nickel, cobalt, tungsten, niobium, aluminum, metal compounds such as metal fluorides, metal oxides, metal sulphides, metal nitrides, metal carbides, metal phosphides, metal selenides, metal silicides and compounds thereof, but also carbon, germanium, cermet, iron oxide and the like.

The absorber layer and the reflection layer preferably are vapor-deposited by the vacuum vapor deposition method.

Vapor deposition methods of the most different types are suitable for the production of the layers. One methodic group is formed by physical vapor deposition (PVD) with evaporation boat, vapor deposition by resistance heating, vapor deposition by induction heating or also electron-beam vapor deposition, sputtering (DC or AC) and electric-arc vapor deposition. Furthermore, the vapor deposition can also be effected by chemical vapor deposition (CVD) as e.g. sputtering in reactive plasma or any other plasma-activated vapor deposition method. Basically, there is also the possibility that dielectric layers are printed on.

If dispersion particles with different refractive indexes are at the disposal, the color-shift security element can also be designed such that the printed layer comprises two or a plurality of partial layers, which each contain mainly spherical, monodisperse dispersion particles with refractive indexes differing from each other. The partial layers can also be separated by a semitransparent metal layer or, alternatively, while abandoning any semitransparent metal layers lying in between, they are disposed directly one above the other. In this case the result is a nearly fully transparent security element that shows different color effects when viewed from different viewing angles. Such a security element displays its optical effect best in front of a dark background.

If between the individual partial layers a semitransparent metal layer is applied, with a transmission of the semitransparent layers appropriately chosen, one obtains a security element that shows a clearly perceivable color shift effect even without an absorbing background.

According to an advantageous development of the invention the thin-layer element has a second absorber layer on the side of the reflection layer facing away from the spacer layer, and a second spacer layer disposed between the second absorber layer and the reflection layer, so that a thin-layer element with color shift effects visible from both sides is the result. The second spacer layer is formed by a second printed layer having dispersion particles with monomodal or oligomodal size distribution. Preferably, the second printed layer contains a main species of mainly spherical, monodisperse dispersion particles, such as described above in connection with the first printed layer. Such symmetrically formed security elements can be used in security papers or documents of value, which have a window area or a hole. The security element is attached above the window area or hole, so that it is visible from both sides.

Advantageously, the first and second printed layer each contain a main species with different diameters and/or different refractive indexes, so that on each of the two sides of the security element a different color shift effect can be recognized.

In the spaces between the dispersion particles expediently is disposed a matrix filling made of polymer material, which levels the printed layer and produces a good adhesion of the dispersion particles to each other and to the layer therebelow. Such a matrix filling can be formed in a temperature step for example by the shells of the core-shell dispersion particles forming a film or by additional species of dispersion particles forming a film.

In an advantageous development of the invention the thin-layer element is provided with an areal diffraction structure in order to form a color-shift hologram. In a variant the absorber layer, the spacer layer and the reflector layer are disposed in this order on a carrier with the areal diffraction structure. In another variant the layer sequence is vice versa, so that the reflector layer, the spacer layer and the absorber layer are disposed in this order on the carrier.

The carrier can be formed, for example, by an embossed lacquer layer on a plastic layer provided with a diffraction structure, which forms part of the finished security element. When applying the further layers the diffraction structure of the embossed lacquer layer continues to exist in this further layers in a vertically upward direction. The layers can also be produced on an intermediate carrier, which is removed when finishing the security element or when the security element is applied onto or incorporated into an object at the latest. The absorber layer of such a color-shift hologram typically has a transmission of between 25% and 75%. Preferably, the thin-layer structure of the security elements according to the invention is applied onto a substrate. The substrate preferably is a transparent plastic foil, such as e.g. polyester.

The above described security elements for example can have the form of a security strip, a security thread, a security band, a label-shaped individual element (patch) or a transfer element for applying onto a security paper, document of value or the like.

The invention also comprises a security paper for producing security documents, such as bank notes, ID cards or the like provided with an above-described security element. The security paper in particular can contain at least one through window area or a hole, which is covered with the security element. In this case advantageously a symmetric security element is used, the color shift effects of which are visible from the two sides.

The invention further comprises a document of value provided with an above-described security element, for example, a bank note. The document of value can also contain a window area covered with the security element or a such covered hole.

The described security element, security paper or document of value can be used, inter alia, for securing goods of any kind.

For manufacturing a security element for security papers, documents of value and the like, which contains a thin-layer element with color shift effect, which has a reflection layer, an absorber layer and a spacer layer disposed between reflection layer and absorber layer, according to the invention it is provided that the spacer layer is applied with the help of a printing method with a printing ink having dispersion particles with monomodal or oligomodal size distribution.

The spacer layer in particular is applied by gravure printing, flexographic printing or offset printing. Preferably, for this a printing ink is used that contains a main species of mainly spherical, monodisperse dispersion particles. When printing the solids content of the ink and the transferred portion expediently are adjusted in such a way that on the reflection layer predominantly a monolayer or submonolayer with the dispersion particles is formed.

The printed spacer layer advantageously is subjected to a temperature step, in the course of which at least one constituent of the printing ink melts. The melting constituent can be formed, for example, by the dispersion particles themselves, the shell of the dispersion particles, or an additional dispersion particle species. The molten constituent forms a film and thereby levels the printed layer and furthermore improves the adhesion of the dispersion particles to each other and to the background.

If the thin-layer element on the side of the reflection layer facing away from the spacer layer has a second spacer layer and a second absorber layer, then according to the invention the second spacer layer is also applied by a printing method with a printing ink having dispersion particles with monomodal or oligomodal size distribution. The result is a symmetric thin-layer element with color shift effects visible from the two sides. For the second spacer layer, as for the first spacer layer, preferably a printing ink is used, which contains a main species of mainly spherical, monodisperse dispersion particles.

According to a preferred development for the first and second spacer layer printing inks are used, which each contain a main species with different diameters and/or different refractive indexes, so that on each of the two sides of the thin-layer element different color shift effects are recognizable.

The printing of the spacer layer or in the case of a symmetric thin-layer element the two spacer layers especially advantageously is effected in a reel-fed fashion with a layer thickness that is uniform across the entire width of the roll.

A further aspect of the invention comprises a printing ink with optically variable coloring pigments that are formed by interference layer particles.

The layer structure of the interference layer particles comprises a reflection layer, an absorber layer and a spacer layer disposed between reflection layer and absorber layer, the spacer layer being formed by a printed layer having dispersion particles with monomodal or oligomodal size distribution. Concerning the advantageous diameter, the structure, the selected material, the arrangement and other properties of the dispersion particles reference is made to the above explanations given in connection with the security element that likewise are applicable to the dispersion particles of the printing ink.

In a method for producing a printing ink having optically variable coloring pigments a thin-layer element with color shift effect is applied onto a substrate by applying a reflection layer, an absorber layer and a spacer layer onto the substrate, wherein the spacer layer is applied with the help of a printing method with dispersion particles having monomodal or oligomodal size distribution, the thin-layer element is removed from the substrate, the removed thin-layer element is ground into a predetermined particle size, and the particles are mixed with a binding agent as optically variable coloring pigments.

With such printing inks it is of advantage, when a dark background, preferably black ink, is printed beneath the reflection layer. Interference pigments that when printing the printing ink do not come to lie with the appropriate interferential layer structure showing upward but with the black background showing upward disturb the color effect to a far lesser extent than pigments that come to lie with the reflection layer showing upward. The latter reflect white light relatively strongly, what disturbs the desired color effect through the interferential layer structure.

In a preferred embodiment the layer structure of the interference layer particles comprises a first absorber layer, a first spacer layer, a reflection layer, a second spacer layer and a second absorber layer, wherein the first spacer layer is disposed between the reflection layer and the first absorber layer, and the second spacer layer is disposed between the reflection layer and the second absorber layer. The first and second spacer layer are formed by a first and second printed layer with dispersion particles having monomodal or oligomodal size distribution.

The first and second spacer layer of the interference layer particles preferably each comprise a main species of mainly spherical, monodisperse dispersion particles, the diameters of which determine the thickness of the first or second spacer layer. Concerning the advantageous diameter, the structure, the selected material, the arrangement and other properties of the dispersion particles reference is made to the above explanations given in connection with the security element that likewise are applicable to the dispersion particles of the printing ink.

In a method for producing a printing ink with optically variable coloring pigments
   a) onto a substrate a thin-layer element with color shift effect is applied by applying onto the substrate a first absorber layer, a first spacer layer, a reflection layer, a second spacer layer and a second absorber layer in this order,
   wherein the first and second spacer layer each are applied by a printing method with a printing ink having dispersion particles with monomodal or oligomodal size distribution,
   b) the thin-layer element is removed from the substrate,
   c) the removed thin-layer element is ground into a predetermined particle size, and
   d) the particles are mixed with a binding agent as optically variable coloring pigments.

Regarding the details for the application of the two spacer layers again reference is made to the above explanations given in connection with the security element. The advantageous embodiments mentioned there likewise are applicable to the production of the printing ink.

To all embodiments according to the invention applies that the spacer layer partially is made of different dispersion particles. I.e., it is possible to obtain different color shift effects at different places. For example, two or a plurality of areas having dispersion particles of different sphere size can be printed side by side. It is also conceivable to overprint an all-over spacer layer having dispersion particles of a certain size with a further spacer layer having dispersion particles of a different size dependent on the motif. In such designed security elements at different places the viewer can perceive different color shift effects.

Further embodiments and advantages of the invention are explained in the following with reference to the Figures. For clarity's sake the figures do without a true-to-scale and true-to-proportion representation.

Figure 7:
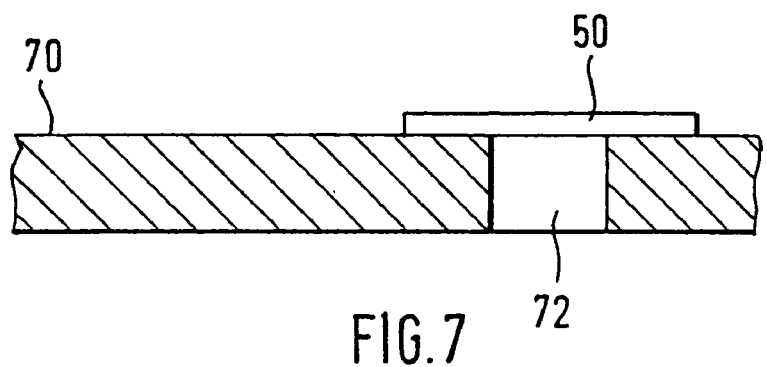
Figure 8:
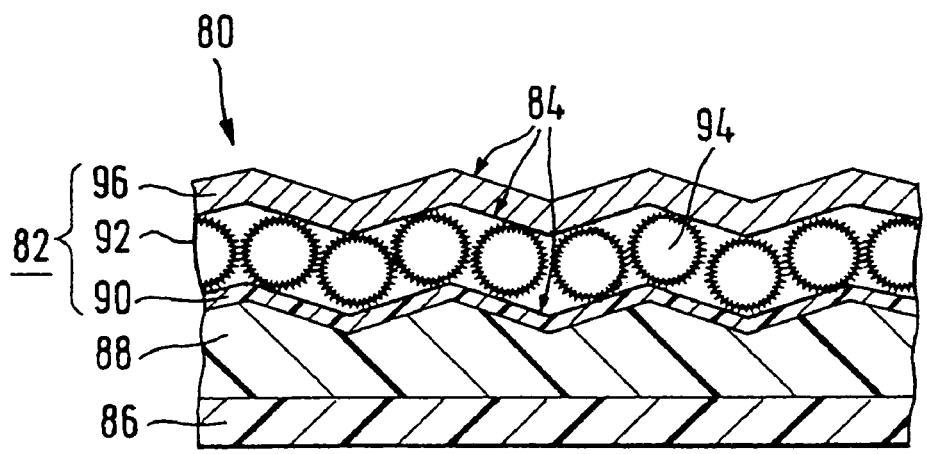

FIG. 1 shows a schematic representation of a bank note having an adhesively bonded color shift transfer element according to an embodiment of the invention, FIG. 2 shows a cross-sectional view of the color shift element of FIG. 1, FIG. 3 (a) shows a printing ink having monodisperse dispersion particles with core-shell structure, and (b) shows a color shift element with a spacer layer printed with the printing ink of FIG. 3(a) according to a different embodiment of the invention, FIG. 4 (a) shows a printing ink, which beside a monodisperse main species also contains high-melting dispersion particles of a smaller diameter, and (b) shows a color shift element with a spacer layer printed with the printing ink described in FIG. 4(a) according to a further embodiment of the invention, FIG. 5 (a) shows a printing ink, which beside a monodisperse main species also contains easily film-forming dispersion particles of a smaller diameter, and (b) shows a color shift element with a spacer layer printed with the printing ink described in FIG. 5(a) according to another further embodiment of the invention, FIG. 6 shows a cross-sectional view of the color shift element according to a further embodiment of the invention, FIG. 7 shows a section through a bank note with punched out opening, which is covered with a color shift element of the kind shown in FIG. 6, FIG. 8 shows a cross-sectional view of the color shift hologram according to a further embodiment of the invention, and FIG. 9 shows a printing ink with optically variable coloring pigments according to an embodiment of the invention.

In the following the invention is explained with reference to a bank note. FIG. 1 shows a schematic representation of a bank note 10 having an adhesively bonded color shift transfer element 12. The color shift element 12 can cover, as shown below, a window area or a hole in the bank note, or it can be applied onto a closed and mainly opaque part of the bank note. In the last case, which in the following is explained in more detail with reference to FIG. 1 to 5, the color shift element 12 has a color shift effect only visible when viewed from the front.

The layer structure of the color shift element 12 according to a first embodiment of the invention is schematically shown in cross-section in FIG. 2. The color shift element 12 has a reflection layer 14, which is formed by an opaque metal layer, an absorber layer 18 and a spacer layer 16 disposed between these layers.

In the embodiment the spacer layer 16 is printed with a printing ink with monodisperse dispersion particles 20, which have a diameter of 400 nanometers. After the printing ink having dried the dispersion particles 20 form a uniform and regular structure on the reflection layer 14. The solids content of the printing ink and the transferred portion are adjusted such that the result mainly is a monolayer made of dispersion particles 20 on the surface of the reflection layer 14.

Due to the uniform diameter of the monodisperse dispersion particles 20 the spacer layer 16 has a very uniform layer thickness, which mainly corresponds to the diameter of the dispersion particles 20. Defective spots or gaps in the ordered structure formally result in a submonolayer of dispersion particles 20. These order defects, however, do not lead to a deterioration of the layer thickness constancy as long as the accumulation density of the dispersion particles 20 is dense enough.

It is understood, that the diameter of the dispersion particles 20 is chosen corresponding to the desired color of the color shift element 12 while considering the refractive index of the dispersion particle material.

FIG. 3 (a) shows a printing ink 22, wherein monodisperse core-shell particles 24 are dispersed in water. The core-shell particles 24 have a high-melting core 26 and an easily film-forming shell 28. For example, the core 26 can be made of polystyrene and the shell 24 of polybutyl acrylate. After the application of the printing ink 22 onto the reflection layer 14 in a subsequent process step the spacer layer 16 is dried. The shells 28 of the dispersion particles 24 melt and form a film so that an embedding matrix 30 is the result as shown in FIG. 3(b). Thereby both a levelling of the printed layer 16 is obtained and the adhesion of the remaining cores 26 of the dispersion particles to each other and to the reflection layer 14 therebelow is improved.

A further embodiment of the invention is shown in FIG. 4. The printing ink 32 of the FIG. 4(a) beside a monodisperse main species 34 also contains high-melting dispersion particles 36 of a smaller diameter. Thus in the embodiment the size distribution of the dispersion particles 34 and 36 is bimodal. When printing the printing ink 32 onto the reflection layer 14 the smaller dispersion particles 36 fill the spaces 38 between the larger particles 34 and level out the printed layer 16. It is understood, that the size distribution of the smaller particle species 36 does not have to be as narrow as the distribution of the main species 34, since for the thickness of the spacer layer 16 they are of minor importance.

FIG. 5 shows a further embodiment with a printing ink 40, wherein the smaller dispersion particles 42 in contrast to the above described printing ink 32 are easily film-forming. After the application of the printing ink 40 onto the reflection layer 14, in a temperature step the dispersion particles 42 are melted to form a film 44. As described in connection with FIG. 3, the embedding film 44 leads to a levelling of the printed layer 16 and an improved adhesion of the main species 34.

A security element with symmetric layer structure, wherein from the two sides a color shift effect is visible, is illustrated in FIG. 6. The thin-layer element 50 shown therein contains a first absorber layer 52, a first spacer layer 54, an opaque reflector layer 56, a second spacer layer 58 and a second absorber layer 60. The two spacer layers 54 and 58, as described above, are formed by a printed layer with monomodal or oligomodal dispersion particle size distribution.

In the embodiment the first spacer layer 54 is printed with a printing ink having monodisperse dispersion particles 62 of a diameter of 400 nanometers, the second spacer layer 58 with a printing ink having monodisperse dispersion particles 64 with a diameter of 300 nanometers. Corresponding to the different sizes of the dispersion particles 62, 64 on the front and back of the thin-layer element 50 appear different color shift effects. It is understood, that also for the symmetric security element dispersion particles with core-shell structure or printing inks with additional dispersion particles of smaller diameter, as shown in FIGS. 3 to 5, can be used.

A use of the symmetric thin-layer element 50 is shown in FIG. 7, which shows a bank note 70 with an opening 72 punched through. On the front of the bank note 70 the opening 72 is completely covered by the thin-layer element 50 of the FIG. 6. When viewing the bank note 70 from the front, due to the opaque reflection layer 56 only the one color shift effect is visible which is determined by the upper spacer layer 54 with its 300-nanometers-diameter dispersion particles.

If the bank note 70 is viewed from the back, through the opening 72 the back of the thin-layer element 50 and thus only the second color shift effect is recognizable which is determined by the lower spacer layer 58 and its 220-nanometers-diameter dispersion particles. The color shift effect which is different on each of the two sides can be easily checked by laymen but is difficult to imitate and thus substantially increases the security of the bank note provided with the security element 50.

The security element 80 of the embodiment shown in FIG. 8 is a so-called color-shift hologram. The security element 80 comprises a thin-layer element 82 with color shift effect, which additionally is provided with an areal diffraction structure 84. Onto a carrier foil 86 is applied an embossed lacquer layer 88, in which is embossed a diffraction structure 84. Onto the embossed lacquer layer 88 is vapor-deposited a semitransparent absorber layer 90 having a transmission of between 25% and 75%, in the embodiment about 50%.

Onto the absorber layer 90 is applied a spacer layer 92, which is formed by an above-described printed layer with dispersion particles of monomodal or oligomodal size distribution. In FIG. 8 for simplicity's sake merely the case of a monodisperse species of dispersion particles 94 is illustrated, but it is obvious, that also all other described dispersion particles can be used.

The spacer layer 92 is coated with a reflector layer 96, in the embodiment made of aluminum. When applying the absorber layer 90, the spacer layer 92 and the reflector layer 96, the areal diffraction structure 84 of the embossed lacquer layer 88 continues to exist in an upward direction in the applied layers, so that in the finished color-shift hologram 80 all partial layers have a diffraction structure. The field of application of such color shift holograms 80 produced by printing is just as wide and various as that for conventional diffraction holograms.

The symmetric thin-layer elements 50 described in connection with FIG. 6 can be used for producing a printing ink with optically variable coloring pigments. Such a printing ink is schematically shown in FIG. 9. For producing the printing ink 100 onto a substrate is applied a thin-layer element 50 with color shift effect, such as described in detail in connection with FIG. 6. The thin-layer element 50 is then removed from the substrate and the removed thin-layer element is ground into a predetermined particle size. The particles then are mixed with a binding agent 100 as optically variable coloring pigments 102. In this way optically variable coloring pigments for printing inks can be produced in a simple and cost-effective fashion.

The invention claimed is
1. A security element for security papers, documents of value and the like, comprising a thin-layer element with color shift effect, said element including a reflection layer, an absorber layer and a spacer layer disposed between reflection layer and absorber layer, and wherein the spacer layer is formed by a printed layer having dispersion particles with monomodal or oligomodal size distribution;
   wherein the printed layer contains a main species of mainly spherical, monodisperse dispersion particles, the diameter of which determines the thickness of the spacer layer; and
   wherein the dispersion particles of the main species have a core-shell structure with a high-melting core and an easily film-forming shell.

2. The security element according to claim 1, wherein the dispersion particles of the main species have a diameter which lies between about 100 nanometers and about 1500 nanometers.

3. The security element according to claim 1, wherein the printed layer comprises a monolayer or submonolayer of the dispersion particles of the main species.

4. The security element according to claim 1, wherein the dispersion particles of the main species have a melting temperature in the range of 50° C. to 250° C.

5. The security element according to claim 1, wherein the dispersion particles of the main species are formed of polystyrene, styrene-acrylonitrile copolymers (SAN), aromatic polyesters or polyamides.

6. The security element according to claim 1, wherein the core of the dispersion particles is formed of a hard polymer such as polystyrene, PMMA, styrene-acrylonitrile copolymers (SAN) or aromatic polyesters, and the shell is formed of PMMA, polybutadiene or polyisoprene.

7. The security element according to claim 1, wherein the printed layer beside the dispersion particles of the main species also contains smaller dispersion particles said smaller dispersion particles disposed in spaces between the dispersion particles of the main species.

8. The security element according to claim 1, wherein the reflection layer is opaque.

9. The security element according to claim 1, wherein the reflection layer is formed by a semitransparent metal layer.

10. The security element according to claim 1, wherein the reflection layer is formed by a transparent reflection layer which has a refractive index differing from that of the printed layer.

11. The security element according to claim 1, wherein the printed layer comprises two or a plurality of partial layers, each partial layer containing mainly spherical, monodisperse dispersion particles with refractive indices differing from each other.

12. The security element according to claim 11, wherein at least two of the partial layers are separated by a semitransparent metal layer.

13. The security element according to claim 11, wherein at least two of the partial layers are disposed directly one above the other.

14. The security element according to claim 1, wherein the thin-layer element on a side of the reflection layer facing away from the spacer layer has a second absorber layer and a second spacer layer disposed between the second absorber layer and the reflection layer, so that the result is a thin-layer element with color shift effects visible from both sides, wherein the second spacer layer is formed by a second printed layer having dispersion particles with monomodal or oligomodal size distribution.

15. The security element according to claim 14, wherein the second printed layer contains a main species of mainly spherical, monodisperse dispersion particles having a diameter which lies between about 100 nanometers and about 1500 nanometers.

16. The security element according to claim 15, wherein the first and second printed layer each contain a main species with different diameters and/or different refractive indexes, so that from the two sides of the security element different color shift effects are recognizable.

17. The security element according to claim 1, wherein the spaces between the dispersion particles a matrix filling made of polymer material is disposed.

18. The security element according to claim 1, wherein the thin-layer element is provided with an areal diffraction structure.

19. The security element according to claim 18, wherein the absorber layer, the spacer layer and the reflection layer are disposed in the recited order on a carrier having the areal diffraction structure.

20. The security element according to claim 18, wherein the reflection layer, the spacer layer and the absorber layer are disposed in the recited order on a carrier having the areal diffraction structure.

21. The security element according to claim 18, wherein the absorber layer has a transmission of between 25% and 75%.

22. The security element according to claim 18, wherein the areal diffraction structure is formed by an embossed structure.

23. The security element according to claim 1, wherein the security element forms a security strip, a security thread, a security band, a patch or a transfer element for applying onto a security paper, document of value and the like.

24. A security element according to claim 1, wherein the security element is secured to goods of any kind for protecting the goods.

25. A security paper for producing security documents, such as bank notes, ID cards or the like, which is provided with a security element according to claim 1.

26. The security paper according to claim 25, with at least one window area or hole covered with the security element.

27. A document of value, such as bank note, ID card or the like, which is provided with a security element according to claim 1.

28. The document of value according to claim 27, with at least one window area or hole covered with the security element.

29. A method for manufacturing a security element for security papers, documents of value and the like, which contains a thin-layer element with color shift effect that has a reflection layer, an absorber layer and a spacer layer disposed between reflection layer and absorber layer, comprising applying the spacer layer by a printing method with a printing ink having dispersion particles with monomodal or oligomodal size distribution; and
wherein the printed spacer layer is subjected to a heating step, during which at least one constituent of the printing ink melts.

30. The method according to claim 29, wherein the spacer layer is applied by gravure printing, flexographic printing, or offset printing.

31. The method according to claim 29, wherein a printing ink is used, which contains a main species of substantially spherical, monodisperse dispersion particles.

32. The method according to claim 29, wherein the solids content of the ink and the transferred amount are adjusted during the printing operation in such a way that on the reflection layer substantially a monolayer or submonolayer with the dispersion particles is formed.

33. The method according to claim 29, wherein the printing ink contains dispersion particles, which melt during the heating step.

34. The method according to claim 29, wherein the printing ink has dispersion particles having a core-shell structure with a high-melting core and an easily film-forming shell, wherein the shells of the dispersion particles melt and form a film during the heating step.

35. The method according to claim 29, wherein the printing ink besides a main species of dispersion particles, the diameter of which determines the thickness of the spacer layer, contains dispersion particles with smaller size, which melt and form a film during the heating step.

36. The method according to claim 29, wherein the absorber layer, the spacer layer and the reflection layer are applied in the recited order onto a carrier having an areal diffraction structure.

37. The method according to claim 29, wherein the reflection layer, the spacer layer and the absorber layer are applied in the recited order onto a carrier having the areal diffraction structure.

38. The method according to claim 36, wherein the absorber layer is vapor-deposited onto the carrier or the spacer layer.

39. The method according to claim 29, wherein the thin-layer element on the side of the reflection layer facing away from the spacer layer has a second spacer layer and a second absorber layer, wherein the second spacer layer is applied by a printing method with a printing ink having dispersion particles with monomodal or oligomodal size distribution, so that a thin-layer element with color shift effects visible from the two sides is the result.

40. The method according to claim 39, wherein for the second spacer layer a printing ink is used, which contains a main species of substantially spherical, monodisperse dispersion particles.

41. The method according to claim 39, wherein for the first and second spacer layer printing inks are used, which each contain a main species with different diameters and/or different refractive indexes, so that from the two sides of the thin-layer element different color shift effects are recognizable.

42. The method according to claim 29, wherein the printing of the spacer layer(s) is effected in a reel-fed fashion with a layer thickness uniform across the whole width of the roll.

43. A printing ink with optically variable coloring pigments, comprising interference layer particles, the layer structure of which has a reflection layer, an absorber layer and a spacer layer disposed between reflection layer and absorber layer, wherein the spacer layer is formed by a printing method with dispersion particles having monomodal or oligomodal size distribution, or the layer structure of which comprises a first absorber layer, a first spacer layer, a reflection layer, a second spacer layer and a second absorber layer, wherein the first spacer layer is disposed between the reflection layer and the first absorber layer, the second spacer layer is disposed between the reflection layer and the second absorber layer, and wherein the first and second spacer layer are formed by a first or second printed layer having dispersion particles with monomodal or oligomodal size distribution; and
wherein the dispersion particles of the main species of the first and/or second printed layer have a core-shell structure with a high-melting core and an easily film-forming shell.

44. The printing ink according to claim 43, wherein the first and second printed layer each contain a main species of mainly spherical, monodisperse dispersion particles, the diameters of which determine the thickness of the first or second spacer layer.

45. The printing ink according to claim 44, wherein the dispersion particles of the main species of the first and/or second printed layer have a diameter which lies between about 100 nanometers and about 1500 nanometers.

46. The printing ink according to claim 43, wherein the first and/or second printed layer each comprises a monolayer or submonolayer of the dispersion particles of the main species.

47. The printing ink according to claim 43, wherein the dispersion particles of the main species of the first and/or second printed layer have a melting temperature in the range of 50° C. to 250° C.

48. The printing ink according to claim 43, wherein the dispersion particles of the main species of the first and/ or second printed layer are formed of polystyrene, styrene-acrylonitrile copolymers (SAN), aromatic polyesters or polyamides.

49. The printing ink according to claim 43, wherein the core of the dispersion particles is formed of a hard polymer, such as polystyrene, PMMA, styrene-acrylonitrile copolymers (SAN) or aromatic polyesters, and the shell of PMMA, polybutadiene or polyisoprene.

50. The printing ink according to claim 43, wherein the first and/or second printed layer besides the dispersion particles of the main species also contains dispersion particles with smaller size, which are disposed in spaces between the dispersion particles of the main species.

51. A method for producing a printing ink having optically variable coloring pigments, wherein a thin-layer element with color shift effect is applied onto a substrate by applying a reflection layer, an absorber layer, and a spacer layer onto the substrate, wherein the spacer layer is applied with the help of a printing method with dispersion particles having monomodal or oligomodal size distribution, the thin-layer element is removed from the substrate, the removed thin-layer element is ground into a predetermined particle size and the particles are mixed with a binding agent as optically variable coloring pigments; and wherein after its application the printing ink is subjected to a heating step, during which at least one constituent of the printing ink melts.

52. The method according to claim 51, wherein the spacer layers are applied by gravure printing, flexographic printing, or offset printing.

53. The method according to claim 51, wherein for the application of the spacer layers printing inks are used, said printing inks including a main species of mainly spherical, monodisperse dispersion particles.

54. The method according to claim 51, wherein the solids content of the ink and the transferred portion are adjusted during the printing operation in such a way that on the reflection layer mainly a monolayer or submonolayer with the dispersion particles is formed.

55. The method according to claim 51, wherein the printing ink contains dispersion particles, which melt during the heating step.

56. The method according to claim 51, wherein the printing ink has dispersion particles having a core-shell structure with a high-melting core and an easily film-forming shell, wherein the shells of the dispersion particles melt and form a film during the heating step.

57. The method according to claim 51, wherein the printing ink beside a main species of dispersion particles, the diameter of which determines the thickness of the spacer layer, contains dispersion particles with smaller size, which melt and form a film during the heating step.

* * * * *